(12) United States Patent
Kriener et al.

(10) Patent No.: US 10,101,200 B2
(45) Date of Patent: Oct. 16, 2018

(54) OPTICAL SENSOR USING A RATIO BETWEEN FIRST AND SECOND LIGHT RECEPTION SIGNALS TO EXPAND USABLE SENSING DISTANCE RANGE

(71) Applicant: SICK AG, Waldkirch/Breisgau (DE)

(72) Inventors: Eva-Maria Kriener, Freiburg (DE); Roland Albrecht, Elzach (DE)

(73) Assignee: SICK AG, Waldkirch/Breisgau (DE)

( * ) Notice: Subject to any disclaimer, the term of this patent is extended or adjusted under 35 U.S.C. 154(b) by 51 days.

(21) Appl. No.: 15/235,379

(22) Filed: Aug. 12, 2016

(65) Prior Publication Data

US 2017/0045395 A1    Feb. 16, 2017

(30) Foreign Application Priority Data

Aug. 14, 2015  (EP) .................................. 15181080

(51) Int. Cl.
| | |
|---|---|
| *G01J 1/42* | (2006.01) |
| *G01S 17/02* | (2006.01) |
| *G01S 7/481* | (2006.01) |
| *G01J 1/04* | (2006.01) |

(Continued)

(52) U.S. Cl.
CPC ........... *G01J 1/4228* (2013.01); *G01J 1/0414* (2013.01); *G01J 1/0437* (2013.01); *G01S 7/4812* (2013.01); *G01S 7/4816* (2013.01); *G01S 17/026* (2013.01); *G02B 27/106* (2013.01); *G06K 7/10732* (2013.01)

(58) Field of Classification Search
CPC .............................. G11B 7/0912; G11B 7/133
See application file for complete search history.

(56) References Cited

U.S. PATENT DOCUMENTS

| | | | | |
|---|---|---|---|---|
| 5,056,913 | A | * 10/1991 | Tanaka | .................... G01S 7/499 250/225 |
| 5,062,091 | A | * 10/1991 | Maeda | .............. G11B 11/10521 369/13.02 |
| 6,021,946 | A | 2/2000 | Hippenmeyer et al. | |

(Continued)

FOREIGN PATENT DOCUMENTS

| | | |
|---|---|---|
| DE | 3203720 C2 | 8/1983 |
| DE | 4229313 A1 | 3/1994 |

(Continued)

*Primary Examiner* — Thanh Luu
(74) *Attorney, Agent, or Firm* — Nath, Goldberg & Meyer; Jerald L. Meyer; Stanley N. Protigal

(57) ABSTRACT

The invention relates to an optical sensor having a light transmitter for transmitting transmitted light into a detection zone, having a first and a second light receiver which are configured for receiving received light from the detection zone which is reflected in a reflective or diffuse manner and for generating received signals from the received light, and having an evaluation unit for generating a detection signal from the received signals. The light receivers are arranged such that each light receiver receives a portion of the received light. Each light receiver has an effective reception surface, with the effective reception surface of the second light receiver being smaller than the effective reception surface of the first light receiver such that the ratio between the received signal generated by the first light receiver and the received signal generated by the second light receiver depends on the sensing distance of the detected object.

18 Claims, 4 Drawing Sheets

Figure 1:
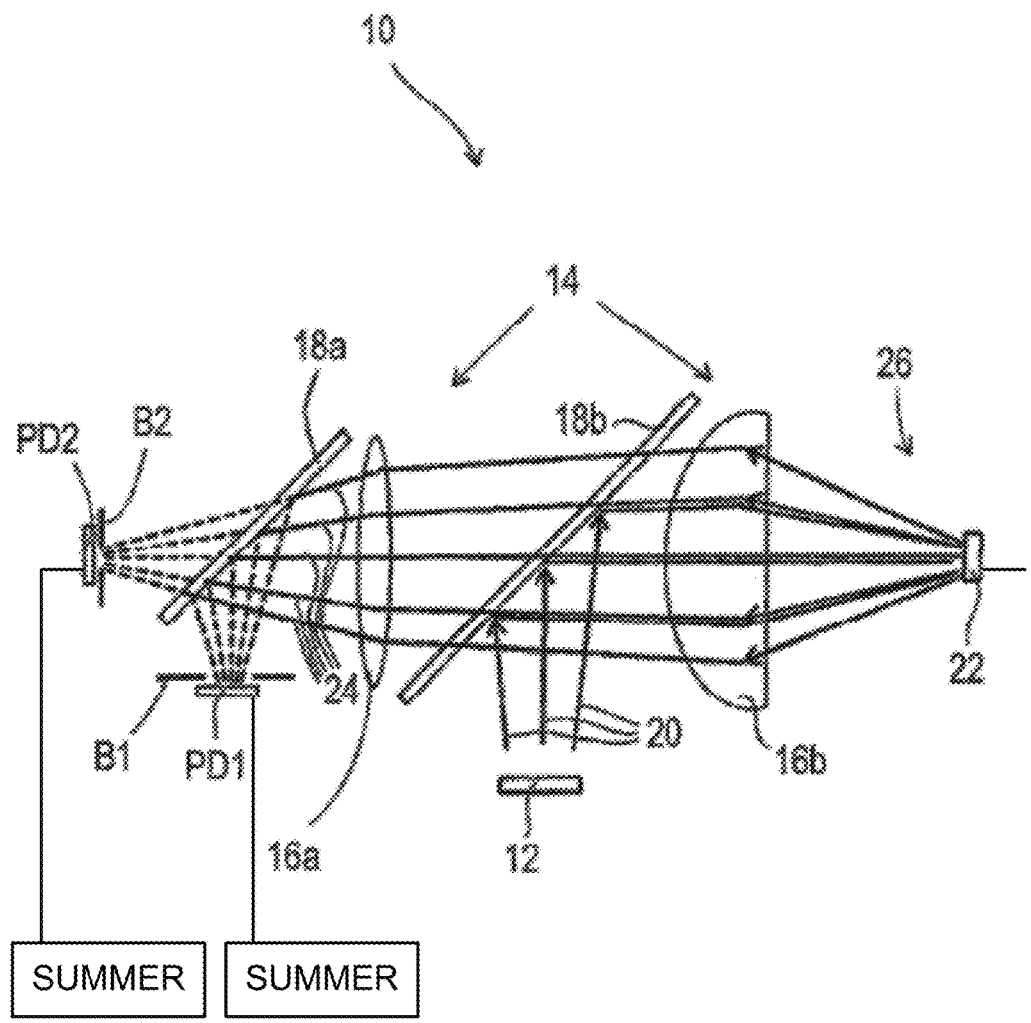

(51) Int. Cl.
*G02B 27/10* (2006.01)
*G06K 7/10* (2006.01)

(56) References Cited

U.S. PATENT DOCUMENTS

| | | | |
|---|---|---|---|
| 2013/0215409 A1 | 8/2013 | Wiethege et al. | |
| 2014/0355006 A1* | 12/2014 | Hotta | G01N 21/47 |
| | | | 356/614 |

FOREIGN PATENT DOCUMENTS

| | | |
|---|---|---|
| DE | 19710724 A1 | 9/1998 |
| DE | 19730341 A1 | 1/1999 |
| DE | 19846002 A1 | 4/2000 |
| DE | 19945442 A1 | 4/2001 |
| EP | 1816488 A1 | 8/2007 |
| EP | 2629050 A1 | 8/2013 |
| EP | 2848960 A1 | 3/2015 |

\* cited by examiner

OPTICAL SENSOR USING A RATIO BETWEEN FIRST AND SECOND LIGHT RECEPTION SIGNALS TO EXPAND USABLE SENSING DISTANCE RANGE

The invention relates to an optical sensor having a light transmitter for transmitting transmitted light into a detection zone, having a first and a second light receiver which are configured for receiving received light from the detection zone which is reflected in a reflective or diffuse manner by an object to be detected and for generating received signals from the received light, and having an evaluation unit for generating a detection signal from the received signals.

Optical sensors are, for example, used in automation technology to recognize or read out contrast marks or codes affixed to an object. Fluctuations of the sensing distance, i.e. of the distance between the optical sensor and the objects to be detected, can negatively influence the detection reliability since the intensity of the received light detected by the light receiver or receivers drops as the sensing distance increases and the light spot produced on the object by the light transmitter can be imaged onto the light receiver in blurred form when the object is located outside the depth of field of a reception optics of the optical sensor.

An optical sensor is described in DE 32 03 720 C2 which is configured for recognizing optical code marks affixed to articles. A relative movement takes place between the optical sensor and the articles and the code marks are imaged sequentially onto the light receiver on the basis of said relative movement, wherein two light receivers are arranged after one another in the reading direction at such a spacing that the code marks are first imaged on the one light receiver and then on the other light receiver. Fluctuations of the sensing distance can be recognized and taken into consideration by means of a difference formation of the received signals of the two light receivers. A relative movement between the optical sensor and the article is therefore necessary in the known method.

Further optical sensors are described in DE 197 30 341 A1, DE 199 45 442 A1 and DE 198 46 002 A1.

It is the object of the invention to provide an optical sensor which allows a reliable detection with a varying sensing distance or with different sensing distances in a simple manner and with a small effort and/or expense, that is which in particular expands the usable sensing distance range.

The object is satisfied by an optical sensor having the features of claim 1. Provision is made in accordance with the invention that the light receivers are arranged such that each light receiver receives a portion of the received light and such that each light receiver has an effective reception surface, wherein the effective reception surface of the second light receiver is smaller than the active reception surface of the first light receiver so that the ratio between the received signal generated by the first light receiver and the received signal generated by the second light receiver depends on the sensing distance of the detected object. The fact is utilized with the optical sensor in accordance with the invention that a light spot which is produced by the reflected received light on the light receivers has a minimal diameter or cross-section when the detected object is located within the nominal sensing distance. That sensing distance is called the nominal sensing distance which is designed for the optical sensor. If the object is located outside the nominal sensing distance, the light spot increases, which has the result that the irradiation on the light receiver, i.e. the power of the received light per unit area is reduced. The size of the second reception surface is selected in this respect such that an expansion of the received light which is reflected in the direction of the second light receiver and which is caused by the deviation from the nominal sensing distance of the optical sensor has the result that only a part cross-section of the received light is detected, which results in a reduction of the corresponding received signal power. The differently sized effective reception surfaces of the light receivers have the result that this reduction in the signal intensity has a comparatively smaller effect on the signal level with the first light receiver than with the second light receiver. The effective reception surface of the first light receiver is in this respect advantageously dimensioned such that at least a substantial portion of the received light is incident onto the effective reception surface of the first light receiver at least within the provided sensing distance range for which the optical sensor is configured.

The ratio of the received signals predominantly depends on the sensing distance; the influence of the reflection properties of the detected object is negligible. Information on the sensing distance or on deviations from the nominal sensing distance can therefore be acquired from the ratio of the received signals. This information can be used to take account of changes of the sensing distance in the evaluation of the detection signals.

In accordance with an advantageous embodiment of the invention, the evaluation unit is configured to determine a correction factor dependent on the sensing distance on the basis of the received signal generated by the second light receiver and to generate a corrected received signal from the received signal generated by the first light receiver while using the correction factor. The received signal generated by the first light receiver can in particular be corrected such that it has a progression which is as linear as possible, preferably as constant as possible, over the sensing distance. The correction factor can be determined by means of an algebraic equation which can be acquired from the progression of the received signal generated by the second light receiver over the sensing distance or can be determined by means of a look-up table. Both the equation and the look-up table can be calculated from the optical and geometrical parameters of the optical sensor or can be determined with the aid of a teaching procedure.

In accordance with a further advantageous embodiment, the size of the effective reception surface of at least one light receiver is determined by its light-sensitive surface.

Alternatively or additionally, a respective diaphragm can be arranged in the optical path in front of at least one light receiver such that the size of the reception surface on the at least one light receiver is determined by the cross-section of the diaphragm and/or by the spacing of the diaphragm from the at least one light receiver. Accordingly, the size of the effective reception surface can be determined with both light receivers either by means of the light-sensitive surface of the light receivers or by means of an associated diaphragm. Alternatively, the size of the effective reception surface of the one light receiver can be determined by its light-sensitive surface and the size of the effective reception surface of the other light receiver can be determined by a diaphragm. It is furthermore possible to define the effective reception surface with one or both light receivers both by the light-sensitive surface and by the diaphragm arranged upstream, wherein the criterion whether the light-sensitive surface or the diaphragm is the determining factor can depend on the sensing distance and thus on the angle of incidence of the received light.

When a diaphragm is used, its cross-section can advantageously be adjustable. A simplified adaptation of the nominal sensing distance of the optical sensor is in particular hereby possible. In general, however, diaphragms having a fixed cross-section can also be used.

In accordance with a further advantageous embodiment, a common reception optics is arranged in the optical path between the detection zone and the light receivers and comprises at least one reception lens, in particular a converging lens. The production and adjustment effort can hereby be simplified since a separate reception optics does not have to be installed and adjusted for each light receiver.

The reception optics advantageously comprises a converging lens arrangement having a variable focal length. A simple adaptation of the nominal sensing distance of the optical sensor to the respective purpose of use is thereby possible without complex and/or expensive adjustment work being necessary. The use of a converging lens arrangement having a variable focal length as a reception optics has in particular proven its value in connection with the use of variable diaphragms for bounding the effective reception area. The reception optics can furthermore comprise a variable diaphragm.

In accordance with a further advantageous embodiment, a beam splitter is arranged upstream of the light receivers in the optical path and deflects a portion of the received light to the first light receiver and another portion of the received light to the second light receiver. Using such a beam splitter, in particular a beam splitter mirror, which is preferably arranged between the reception optics and the light receivers, a splitting of the received light onto the two light receivers can be achieved in a simple manner.

The beam splitter can be configured such that the portion of the received light deflected to the second light receiver is smaller than the portion of the received light deflected to the first light receiver. The splitting ratio of the beam splitter can amount to 80:20, for example. Since the actual information on the object to be detected is acquired as a rule from the received signals of the first light receiver with the optical sensor in accordance with the invention, while the received signals of the second light receiver only serve for the acquisition of information on the sensing distance or for the linearization of the received signals of the first light receiver over the sensing distance, a better signal-to-noise ratio is produced with respect to a beam splitter which splits the two portions of the received light in a ratio of 50:50.

It has in particular proved advantageous in connection with the use of the above-explained beam splitter having an asymmetrical splitting ratio if the received signals generated by the first light receiver over a first time period and the received signals generated by the second light receiver over a second time period are summed, with the second time period preferably being longer than the first time period. The summing can in this respect take place both in the light receivers, for example by controlling the exposure time, and subsequently in the evaluation unit. Intensity differences can therefore be compensated on the use of asymmetrical beam splitters in this manner. This is based on the idea that a change of the correction factor for the sensing distance can selectively also take place at larger time intervals than the evaluation of a respective received signal generated by the first light receiver.

A further beam splitter can be provided for coupling the transmitted light beam into the optical path, for example between two converging lenses of the reception optics. Such an optical sensor accordingly works in accordance with the principle of autocollimation. In general, the present invention can, however, also be used in an optical sensor having a biaxial arrangement of the optical paths for transmitted light and for received light.

In accordance with a further advantageous embodiment of the invention, the evaluation unit is configured to determine the sensing distance of the detected object on the basis of the ratio between the received signal generated by the first light receiver and the received signal generated by the second light receiver. The determination of the sensing distance is understood as the determination of the absolute sensing distance and/or the determination of a nominal sensing distance of the optical sensor. A distance measurement is thus possible at least within certain limits.

The evaluation unit is advantageously configured to detect a movement of an object, in particular of an object transported through the detection zone transversely to the direction of propagation of the received light, taking place lengthways with respect to the direction of propagation of the received light on the basis of time changes of the ratio between the received signal generated by the first light receiver and the received signal generated by the second light receiver. Unwanted fluttering of material webs, for example film webs or paper webs, can e.g. be recognized in this manner.

Further advantageous embodiments of the invention result from the claims, from the description and from the drawings.

Figure 2:
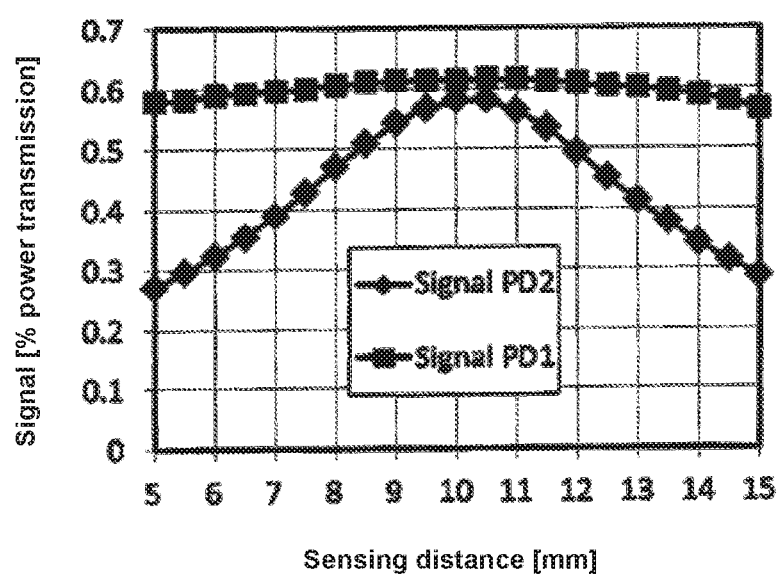
Figure 3:
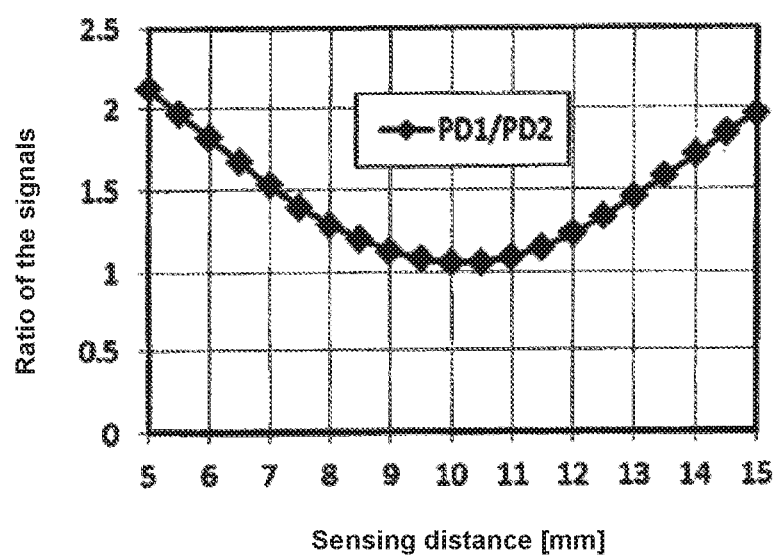

The invention will be described in the following with reference to an embodiment and to the drawings. There are shown:

FIG. 1 a schematic representation of an optical sensor in accordance with the invention in accordance with an embodiment;

FIG. 2 exemplary relative received signal progressions of an optical sensor in accordance with the invention over the sensing distance;

FIG. 3 the ratio of the signal progression of FIG. 2; and

Figure 4:
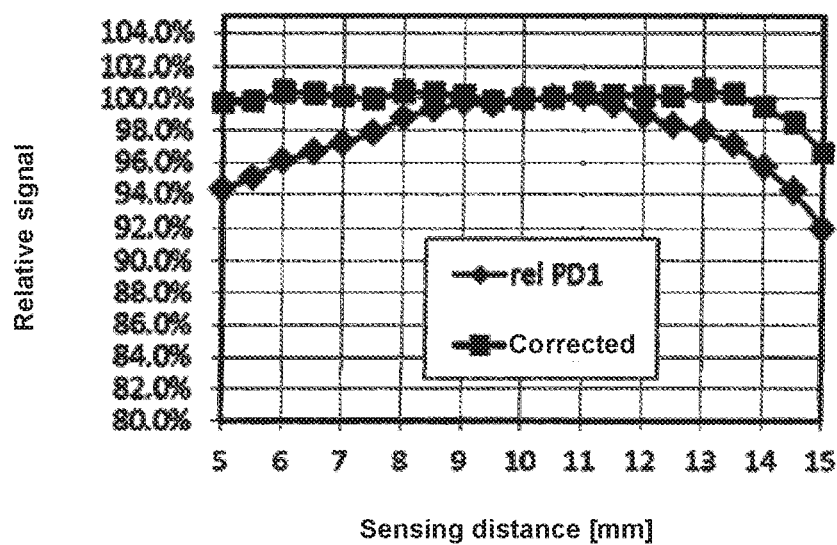

FIG. 4 the received signal progression of the first light receiver over the sensing distance in an uncorrected and a corrected form.

In accordance with FIG. 1, an optical sensor 10 in accordance with the invention comprises a reception optics 14 which has a first converging lens 16a and a second converging lens 16b, a first beam splitter 18a, a second beam splitter 18b, and a first light receiver PD1 and a second light receiver PD2. A respective diaphragm B1 and B2 is associated with the light receivers PD1, PD2. The light receivers PD1, PD2 are connected to an evaluation unit (not shown).

The light-sensitive surfaces of the light receivers PD1, PD2 are at a right angle with respect to one another. The first beam splitter 18a is arranged between the light receivers PD1, PD2 and the first converging lens 16a, while the second beam splitter 18b is located between the first converging lens 16a and the second converging lens 16b. The beam splitters 18a, 18b can, for example, be configured as beam splitter mirrors or as beam splitter prisms.

The light transmitter 12 can comprise one or more light sources, for example lasers or light emitting diodes, and transmits monochrome or polychrome transmitted light 20 in the direction toward the second beam splitter 18b which deflects the transmitted light 20 through the converging lens 16b serving as an objective lens in the direction of a detection zone 26.

An object 22 which is located in the detection zone 26 reflects incident transmitted light 20 diffusely or reflectively as received light 24 back in the direction of the optical sensor 10.

The received light 24 enters through the second converging lens 16b, the second beam splitter 18b and the first converging lens 16a and is incident onto the first beam splitter 18a which deflects a portion of the received light 24 in the direction of the first light receiver PD1 and another portion in the direction of the second light receiver PD2. The received light 24 incident onto the light receivers PD1, PD2 is clipped by the diaphragms B1, B2, with the diaphragms B1, B2 defining the effective reception surface of the light receivers PD1, PD2 in the present case.

As has already been explained above, the received light 24 is imaged onto the light receivers PD1, PD2 through the reception optics 14 as respective light spots, with the light spots as a rule having their smallest diameter when the object 22 is located at the nominal sensing distance. When the object is located closer to or further away from the optical sensor 10, the diameter of the light spots increases, while the irradiation, i.e. the power per surface, incident onto the light receivers PD1, PD2 or onto the diaphragms B1, B2 is reduced. Due to the widening, a portion of the one light spot incident onto the light receiver PD2 is now incident onto the diaphragm B2, which together with the reduction of the irradiation ultimately results in a reduction in the amount of light incident onto the light receiver PD2. Since the cross-section of the diaphragm B1 is, however, larger than the cross-section of the diaphragm B2, the other light spot detected by the light receiver PD1 is also incident completely or at least to a large part onto the light receiver PD after a widening. The diaphragm B1 substantially serves for the masking of interfering light.

The signal progressions reproduced in FIGS. 2 to 4 are based on a simulation for which the following parameters were used as a basis:

|  | PD1/B1 | PD2/B2 |
| --- | --- | --- |
| Light-sensitive surface | 6 mm × 6 mm | 2 mm × 4 mm |
| Diaphragm cross-section | 6 mm × 6 mm | 0.9 mm × 3.4 mm |
| Spacing First beam splitter mirror - Diaphragm | 8 mm | 7.7 mm |
| Spacing Diaphragm - Light receiver | 3.0 mm | 0.5 mm |

The values for the spacings each relate to the pairs of light receivers and diaphragms stated in the column headings.

The progressions of the received signals of the light receivers PD1, PD2 are reproduced in FIG. 2, with the level of the received signals being given in % of the transmission power of the light transmitter 12. The received signals relate to a matte object 22 which scatters in accordance with Lambert's law and has a scatter efficiency of 100%.

Both curves have their maximum at a nominal sensing distance of approximately 10 mm. With larger or smaller sensing distances, both curves fall, with the drop in the received signals of the second light receiver PD2 being substantially larger due to the smaller effective received surface than with the received signals of the first light receiver PD1.

The signal progression of the curve of FIG. 3 reproduces the ratio between the received signals of the first light receiver PD1 and the received signals of the second light receiver PD2, i.e. the quotients of the curves of FIG. 2.

A correction factor can be derived from the progression of the curve of FIG. 3, for example by extrapolation, with which a corrected received signal $S_{PD1,korr}$ can be determined from the uncorrected received signal $S_{PD1}$:

$$S_{PD1,korr.} = S_{PD1} \cdot [S_{PD1}/(S_{PD2} \cdot 1.0593)]^{0.08},$$

where $S_{PD2}$ is the received signal of the second light detector PD2.

In FIG. 4, the upper curve represents the corrected received signal $S_{PD1korr.}$ and the lower curve the original, uncorrected received signal $S_{PD1}$.

As can be recognized from the progression of the curves, the corrected received signal $S_{PD1,korr.}$ has a much reduced deviation from the signal level in the nominal sensing distance with respect to the original, uncorrected received signal $S_{PD1}$.

The larger deviation of the signal level to be determined at larger sensing distances at the right hand margin of the curves is due to a certain asymmetry of the signal progression curves with respect to the nominal sensing distance. The deviation from an ideal constant signal progression within a sensing distance range of 5 mm to 13 mm amounts to a maximum of ±1%.

In comparison therewith, a reduction of the signal fluctuations to less than 10% in a sensing distance range of ±30% of the nominal sensing distance is not possible with a conventional optical sensor in which no signal correction dependent on the sensing distance takes place, not even when all optimizing possibilities with respect to the optical design are utilized.

It is thus possible with the aid of the optical sensor in accordance with the invention to increase the detection reliability on deviations of the sensing distance from the nominal sensing distance or to considerably enlarge the useful sensing distance range without losses in the detection reliability.

REFERENCE NUMERAL LIST 10 optical sensor
12 light transmitter
14 reception optics
16a, 16b converging lens
18a, 18b beam splitter
20 transmitted light
22 object
24 received light
26 detection zone
PD1, PD2 light receiver
B1, B2 diaphragm

The invention claimed is:
1. An optical sensor comprising
a light transmitter for transmitting transmitted light into a detection zone (26);
a first and a second light receiver, which are configured for receiving received light from the detection zone which is reflected in reflective or diffuse manner by an object to be detected and for generating received signals from the received light; and
an evaluation unit for generating a detection signal from the received signals,
wherein the first and second light receivers are arranged such that each of the first and second light receivers receives a portion of the received light;
wherein the received signals generated by the first light receiver over a first time period and the received signals generated by the second light receiver over a second time period are summed, and the second time period is longer than the first time period,
wherein the received light is imaged onto the first and the second light receiver as respective light spots such that each light spot has a minimal diameter when the detected object is located at a nominal sensing distance of the optical sensor; and wherein each of the first and second light receivers has an effective reception surface having a size, with the effective reception surface of the second light receiver being smaller than the effective reception surface of the first light receiver such that a ratio between the received signal generated by the first light receiver and the received signal generated by the second light receiver depends on the sensing distance of the detected object.

2. The optical sensor in accordance with claim 1,
wherein the evaluation unit is configured to determine a correction factor dependent on the sensing distance on the basis of the received signal generated by the second light receiver and the evaluation unit is further configured to generate a corrected received signal from the received signal generated by the first light receiver while using the correction factor.

3. The optical sensor in accordance with claim 1,
wherein the size of the effective reception surface of at least one of the first and second light receivers is determined by its light-sensitive surface.

4. The optical sensor in accordance with claim 1,
further comprising a respective diaphragm that is arranged in the optical path upstream of at least one of the first and second light receivers such that the size of the effective reception surface on the at least one of the first and second light receivers is determined by at least one of a cross-section of the diaphragm and a spacing of the diaphragm from the at least one of the first and second light receivers.

5. The optical sensor in accordance with claim 4,
wherein the cross-section of the respective diaphragm is adjustable.

6. The optical sensor in accordance with claim 1,
further comprising a common reception optics, with the common reception optics comprising at least one reception lens and being arranged in an optical path between the detection zone and the first and second light receivers.

7. The optical sensor in accordance with claim 6,
wherein the reception optics comprises a converging lens arrangement having a variable focal length.

8. The optical sensor in accordance with claim 1,
further comprising a beam splitter, with the beam splitter being arranged in an optical path upstream of the first and second light receivers and being configured to deflect a portion of the received light to the first light receiver and another portion of the received light to the second light receiver.

9. The optical sensor in accordance with claim 8,
wherein the beam splitter is configured such that the portion of the received light deflected to the second light receiver is smaller than the portion of the received light deflected to the first light receiver.

10. The optical sensor in accordance with claim 1,
wherein the evaluation unit is configured to determine the sensing distance of the detected object on the basis of the ratio between the received signal generated by the first light receiver and the received signal generated by the second light receiver.

11. The optical sensor in accordance with claim 1,
wherein the evaluation unit is configured to detect a movement of an object taking place lengthways with respect to the direction of propagation of the received light on the basis of time changes of the ratio between the received signal generated by the first light receiver and the received signal generated by the second light receiver.

12. The optical sensor in accordance with claim 11,
wherein the evaluation unit is configured to detect a movement of an object taking place lengthways with respect to the direction of propagation of the received light on the basis of time changes of the ratio between the received signal generated by the first light receiver and the received signal generated by the second light receiver, the object being transported through the detection zone transversely to the direction of propagation of the received light.

13. An optical sensor comprising
a light transmitter for transmitting transmitted light into a detection zone (26);
a first and a second light receiver, which are configured for receiving received light from the detection zone which is reflected in reflective or diffuse manner by an object to be detected and for generating received signals from the received light; and
an evaluation unit for generating a detection signal from the received signals,
wherein the first and second light receivers are arranged such that each of the first and second light receivers receives a portion of the received light;
wherein each of the first and second light receivers has an effective reception surface having a size, with the effective reception surface of the second light receiver being smaller than the effective reception surface of the first light receiver such that a ratio between the received signal generated by the first light receiver and the received signal generated by the second light receiver depends on the sensing distance of the detected object;
wherein the received signals generated by the first light receiver over a first time period and the received signals generated by the second light receiver over a second time period are summed; and
wherein the second time period is longer than the first time period.

14. The optical sensor in accordance with claim 13,
wherein the evaluation unit is configured to determine a correction factor dependent on the sensing distance on the basis of the received signal generated by the second light receiver and the evaluation unit is further configured to generate a corrected received signal from the received signal generated by the first light receiver while using the correction factor.

15. The optical sensor in accordance with claim 13,
further comprising a respective diaphragm that is arranged in the optical path upstream of at least one of the first and second light receivers such that the size of the effective reception surface on the at least one of the first and second light receivers is determined by at least one of a cross-section of the diaphragm and a spacing of the diaphragm from the at least one of the first and second light receivers
wherein the cross-section of the respective diaphragm is adjustable.

16. The optical sensor in accordance with claim 13,
further comprising a common reception optics, with the common reception optics comprising at least one reception lens and being arranged in an optical path between the detection zone and the first and second light receivers,
wherein the reception optics comprises a converging lens arrangement having a variable focal length.

17. The optical sensor in accordance with claim 13,
further comprising a beam splitter, with the beam splitter being arranged in an optical path upstream of the first and second light receivers and being configured to deflect a portion of the received light to the first light receiver and another portion of the received light to the second light receiver,
wherein the beam splitter is configured such that the portion of the received light deflected to the second light receiver is smaller than the portion of the received light deflected to the first light receiver.

18. The optical sensor in accordance with claim 13,
wherein the evaluation unit is configured to detect a movement of an object taking place lengthways with respect to the direction of propagation of the received light on the basis of time changes of the ratio between the received signal generated by the first light receiver and the received signal generated by the second light receiver; and
wherein the evaluation unit is configured to detect a movement of an object taking place lengthways with respect to the direction of propagation of the received light on the basis of time changes of the ratio between the received signal generated by the first light receiver and the received signal generated by the second light receiver, the object being transported through the detection zone transversely to the direction of propagation of the received light.

* * * * *